United States Patent
Shen et al.

[11] Patent Number: 5,854,386
[45] Date of Patent: Dec. 29, 1998

[54] STABILIZERS FOR POLYMER POLYOLS

[75] Inventors: Jianzhong Shen; Kenneth G. McDaniel, both of West Chester, Pa.; John E. Hayes, Gouvieux, France; Uli B. Holeschovsky, Chester Springs, Pa.; Harry R. Hinney, Cross Lanes, W. Va.

[73] Assignee: ARCO Chemical Technology, L.P., Greenville, Del.

[21] Appl. No.: 918,081

[22] Filed: Aug. 25, 1997

[51] Int. Cl.⁶ .................................................. C08G 59/00
[52] U.S. Cl. ........................ 528/403; 528/405; 528/409; 528/417; 528/419; 528/421
[58] Field of Search .................................... 528/403, 405, 528/409, 417, 419, 421

[56] References Cited

U.S. PATENT DOCUMENTS

| | | |
|---|---|---|
| 3,829,505 | 8/1974 | Herold .............................. 260/611 B |
| 4,454,255 | 6/1984 | Ramlow et al. . |
| 4,472,560 | 9/1984 | Kuyper et al. ......................... 526/120 |
| 5,196,476 | 3/1993 | Simroth . |

FOREIGN PATENT DOCUMENTS

H5-209052  7/1992  Japan .

*Primary Examiner*—Edward J. Cain
*Attorney, Agent, or Firm*—Jonathan L. Schuchardt

[57] ABSTRACT

Unique, well defined polyethers containing both hydroxyl-functionality and unsaturation-functionality are prepared by oxyalkylating an unsaturated monomer having at least one oxyalkylatable hydrogen in the presence of an effective amount of a double metal cyanide complex catalyst, optionally, when necessary, in the presence of a free radical polymerization inhibitor. The resulting polyethers are eminently suitable for such uses as polymer polyol stabilizers or stabilizer precursors, and both in situ and ex situ impact modifiers for thermoplastics.

29 Claims, No Drawings

STABILIZERS FOR POLYMER POLYOLS

TECHNOLOGICAL FIELD

The present invention relates to the field of polymer polyols. More particularly, the subject invention pertains to a process for the preparation of polymer polyol stabilizers, and to polymer polyols prepared therefrom. Polymer polyols prepared by in situ polymerization of vinyl monomers in a polyether polyol, polyester polyol, or polyetherester polyol in the presence of suitable stabilizers, are useful in producing a variety of polyurethane products.

DESCRIPTION OF THE RELATED ART

Polyurethane products such as polyurethane foams and elastomers are generally prepared by the reaction of a di- or polyisocyanate with a hydroxyl-functional polyoxyalkylene polyether polyol. To provide higher strength and load bearing properties, polyether polyols containing vinyl polymer dispersions were developed. Early "polymer polyols" were produced in situ in polyether "base" or "carrier" polyols, generally employing acrylonitrile and/or styrene as polymerizable vinyl monomers. An active, free radical polymerization initiator was utilized to promote vinyl polymerization. These early polymer polyols were generally of high viscosity and low solids content and were often highly colored as well. Attempts to increase solids content led to yet higher viscosity and "seedy" polyols with numerous large polymer particles.

It was found that higher solids polymer polyols of lower viscosity could be produced by adding polyols modified to contain reactive unsaturation. Conventional polyether polyols contain relatively large amounts of unsaturation due to oxyalkylation employing basic catalysts. During base-catalyzed oxyalkylation, propylene oxide continually rearranges to allyl alcohol, producing considerable amounts of allylic-unsaturation-containing monols, at times as much as 40 mol percent of total polyol. However, the special stability associated with the allyl group makes allylic unsaturation much less reactive than other types of unsaturation such as vinyl unsaturation. As a result of the low activity of the allylic unsaturation in conventionally catalyzed polyether polyols, the free radical initiators used to initiate polymerization in situ, tended to generate polyol free radicals in a random manner by abstraction of hydrogen atoms from the polyol backbone, even when the molecule contained allylic unsaturation. Thus, vinyl polymerization was initiated randomly along the backbone also, forming ill-defined and inefficient stabilizers.

Further improvements in the manufacture of polymer polyols were the use of preformed stabilizers, as disclosed in Simroth U.S. Pat. No. 5,196,476, and the use of polyether "macromers" containing reactive unsaturation as disclosed in U.S. Pat. No. 4,454,255. Both these rather different processes employ reaction of hydroxyl functional polyether polyols with a moiety containing both hydroxyl-reactive functionality and reactive unsaturation to form a stabilizer per se or a stabilizer precursor.

Unsaturated reactive moieties such as isocyanatoethylmethacrylate, α,α-dimethyl-m-isopropenyl-benzyl isocyanate (TMI), ethylfumaryl chloride, and the like have been used to directly introduce reactive functionality onto the polyether. The acrylate-functional products have very limited shelf life, and must be prepared just prior to vinyl polymer polymerization. Reactive species such as ethylfumaryl chloride and TMI are relatively expensive. Maleic anhydride may be used to supply reactive unsaturation, but it is then necessary to isomerize the relatively less active maleate-unsaturation to the more highly active fumarate (trans) isomer, and also to cap the remaining acid functionality of the polyol/fumarate half ester with additional alkylene oxide, thus extending processing time and expense.

The use of reactive species such as those described above in the processes of the '476 and '255 patents have increased solids content to the vicinity of 50 weight percent with reasonable viscosity. Further improvements are desired, however. For example, the polydispersity of conventionally base-catalyzed polyether polyols is high. These polyols contain considerable quantities of low molecular weight monols. Thus, the stabilizers produced by reaction of the polyol with an unsaturated, hydroxyl-reactive species also span a wide molecular weight range. Stabilizer molecules of low molecular weight are very inefficient stabilizers. Thus, a large proportion of stabilizer must be used to provide the desired stabilizing effect. Moreover, the stabilizer viscosity tends to be high. This high viscosity translates, in minor part, to higher viscosity in the final polymer polyol product.

In Japanese Kokai H5-209052 (1993), impact modifiers for use in polyvinylchloride are disclosed. These impact modifiers are prepared by the further polyoxypropylation of oligomeric polyoxyalkylated unsaturated alcohols such as allyl alcohol and ω-hydroxyalkylvinyl ethers in the presence of low-unsaturation producing double metal cyanide complex catalysts. However, the product is highly viscous (2200 cps at 75° C.) and yellow in color. The DMC catalysis-derived unsaturation is higher than desired, expected to be in the range of 0.015 meq/g to 0.025 meq/g. The use of oligomeric initiators such as previously polyoxyalkylated oligomers having molecular weights in the range of 1100 Da to 2000 Da is most unfortunate. The use of such high molecular weight starter molecules significantly limits the build ratio obtainable in the polyoxyalkylation reactor.

It would be desirable to prepare better defined reactive unsaturation-containing species which can be used to prepare a wide variety of polymer polyols. It would be further desirable to be able to prepare polymer polyol stabilizers in shorter time and at less cost. It would be yet further desirable to prepare polymer polyol stabilizers which themselves have low viscosity. The stabilizers thus prepared may be used to manufacture polymer polyols, or in other applications where polyethers having both hydroxyl functionality and reactive unsaturation are necessary.

SUMMARY OF THE INVENTION

It has now been surprisingly discovered that well defined reactive unsaturation-containing species may be prepared by oxyalkylating an oxyalkylatable molecule containing reactive unsaturation in the presence of a double metal cyanide complex catalyst and a vinyl polymerization inhibitor. A broad range of active-hydrogen functionalities have been found to be useful in the subject process. The reactive unsaturation-containing polyol derivatives are useful in all types of polyether polymer production, including both macromer-based and preformed stabilizer-based polymer polyol production processes. The products are also useful in other applications such as starters for the preparation of impact-modified polymers such as styrene, ABS, and the like, or in the preparation of tougheners which may be blended with such thermoplastics.

DESCRIPTION OF THE PREFERRED EMBODIMENT

The subject invention process involves the oxyalkylation of a reactive-unsaturation-containing, active hydrogen initiator molecule with one or more alkylene oxides in the presence of a double metal cyanide complex catalyst under conditions where no substantial addition polymerization involving the sites of unsaturation occurs. Thus, the "initiator" or "starter" molecules must have at least one site of ethylenic or acetylenic unsaturation, and at least one functionality capable of being oxyalkylated, the oxyalkylatable functionalities comprising not more than one carboxylic acid group per molecule. Suitable non-carboxylic acid functionalities are hydroxyl, amine, sulfhydryl, alkanolamine, and the like. Essentially all oxyalkylatable functionalities may be used. Preferred, however, are initiator molecules having hydroxyl functionalities. Non-limiting examples of such starter molecules, for example, are hydroxyalkylacrylates and methacrylates such as hydroxyethylacrylate, hydroxypropylacrylate, hydroxybutylacrylate, hydroxyethylmethacrylate and hydroxypropylmethacrylate; unsaturated monocarboxylic acids, particularly α-unsaturated acids such as acrylic acid and methacrylic acid; half esters of unsaturated carboxylic acids such as maleic acid methyl half ester, maleic acid ethyl half ester, and fumaric acid methyl half ester; oligomeric reaction products of unsaturated dicarboxylic acids or acid anhydrides with diols or polyoxyalkylene oligomer glycols such as bis(2-hydroxyethyl)maleate and bis(2-hydroxyethyl)fumarate; unsaturated aromatic compounds such as 4-vinylphenol, and the like. This list is illustrative only, and not limiting. The initiator molecule must have reactive unsaturation as well as at least one oxyalkylatable functionality, and not more than one free (non-derivatized) carboxylic acid group per molecule. The initiator molecules may have more than one site of reactive unsaturated functionality as well, e.g. glyceryl-diacrylate, and divinylphenol. The molecular weight of the initiator molecule should be below 500 Da, and more particularly below 300 Da. When the starter is polymeric (oligomeric), the molecular weight is a number average molecular weight, as are other molecular weights expressed herein unless indicated otherwise.

By the term "reactive unsaturated functionality" is meant ethylenic or ethylynic (acetylenic) unsaturation capable of undergoing free radical induced addition polymerization in the presence of unsaturated monomers. While reactive unsaturation displaying greater reactivity than the allyl group is desirable for the preparation of polymer polyol stabilizers, allylic unsaturation and other unsaturation of similar or lower reactivity may be useful when the novel products of the subject invention are contemplated for other uses, i.e. as impact modifiers, grafted dispersing aids, and the like. Generally, however, the reactive unsaturation is a more active unsaturation such as maleate, and particularly fumarate, acrylic, propenyl, isopropenyl, alkenyl generally, or the like. Ethylynic unsaturation such as that provided by 1,4-butynediol is also useful, as are cyclohexeneols, cyclohexenediols, cyclopentenols, and the like.

Preferably, the stabilizers correspond to mixtures containing one or more of the two formulae: $R[\!-\!(R^2\!-\!O\!-\!)_n H]_o$ or $R\!-\!(X\!-\!\{\!-\!(R^2\!-\!O)_n\!-\!H\}_m)_o$ where o is an integer from 1 to about 8, preferably 1 to about 4, and in particular 1 or 2; n is an integer whose average value is such that the product nxo is from about 10 to about 500, more preferably 15 to about 400, and in particular about 20 to about 250; $R^2$ is alkylene or substituted alkylene, i.e. $C_{2-30}$ alkylene optionally substituted by groups such as halo, i.e. fluoro, chloro, or bromo; alkoxy, i.e. methoxy, nitro; cyano, hydroxyalkyl, and the like; X is a linking group selected from O, S, N,

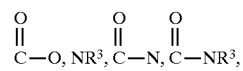

and the like, wherein the number of initially free

linking groups per molecule preferably does not exceed 1; and m is 1 for singly oxyalkylatable linking group precursors and 2 for doubly oxyalkylatable linking group precursors; wherein $R^3$ is $C_{1-8}$ lower alkyl, optionally substituted by the same substituents as optional for R; and wherein R is a $C_{2-30}$ hydrocarbon containing at least one site of ethylenic or ethylynic (acetylenic) unsaturation, optionally substituted by non-reactive groups such as halo, alkoxy, cyano, and the like, and optionally containing interspersed heteroatoms, particularly O, S and/or N. R may be aliphatic, cycloaliphatic, aromatic, arylaliphatic, heteroaromatic, and the like, provided that when R is aromatic or heteroaromatic, the aromatic ring structure is substituted by at least one ethylenic or ethylynic radical-containing group.

The alkylene oxide employed in oxyalkylating the "starter" or "initiator" may be any alkylene oxide polymerizable with double metal cyanide catalysts. Examples include ethylene oxide, propylene oxide, 1,2-and 2,3-butylene oxide, $C_{6-30}$ α-olefin oxides, oxetane, glycidol, and halogenated alkylene oxides. Preferred are propylene oxide and ethylene oxide. Mixtures of more than one alkylene oxide may be used, for example, mixtures of propylene oxide and ethylene oxide. Alkylene oxides and their mixtures may be polymerized onto the initiator molecule in one or more stages, to produce homopolymers, block copolymers, random copolymers, block random copolymers, and the like. "Copolymer" in the present application includes "terpolymer" and mixtures of more than three alkylene oxides as well. Other comonomers may be polymerized along with the alkylene oxide. Examples of copolymerizable monomers include those disclosed in U.S. Pat. Nos. 3,278,457; 3,278,458; 3,404,109; 3,538,043; 3,900,518; 3,941,849; 4,472,560; 5,145,833; 5,145,883; and 5,223,583 which are herein incorporated by reference. Glycidol is a particularly preferred copolymerizable monomer, which may be used to introduce additional hydroxyl functionality.

Suitable double metal cyanide catalysts are by now well known to those skilled in the art. Double metal cyanide complex catalysts are non-stoichiometric complexes of a low molecular weight organic complexing agent and optionally other complexing agents with a double metal cyanide salt, e.g. zinc hexacyanocobaltate. Exemplary double metal cyanide complex catalysts ("DMC catalysts") include those suitable for preparation of low unsaturation polyoxyalkylene polyether polyols as disclosed in U.S. Pat. Nos. 3,427,256; 3,427,334; 3,427,335; 3,829,505; 4,472,560; 4,477,589; and 5,158,922. Preferably however, the DMC catalysts used are those capable of preparing "ultra-low" unsaturation polyether polyols, particularly homopolyoxypropylene polyether polymers and polyoxypropylene/polyoxyethylene random polyether copolymer polyols. The polyoxyalkylene polymers produced by the catalysts typically have levels of unsaturation (other than the purposefully introduced unsaturation of the subject invention starter molecules) less than about 0.010 meq/g as measured by ASTM D-2849-69, "TESTING OF URETHANE FOAM POLYOL RAW MATERIALS". Such catalysts are disclosed in U.S. Pat. Nos. 5,470,813 and 5,482,908, and 5,545,601, which are herein incorporated by reference. Preparation of the unsaturation-containing stabilizers of the present invention is facilitated by such highly active catalysts under conditions where DMC catalysts of lesser activity are often inoperative or lead to addition polymerization of the unsaturated sites unless low oxyalkylation temperatures are used, often leading to gelling of the reactor.

Oxyalkylation conditions may be varied to suit the particular reactive unsaturation-containing initiator, alkylene oxide, and the like. For example, with liquid or low melting initiators, oxyalkylation may be effected by oxyalkylating neat, while with these same initiators or with solid initiators of higher melting point, oxyalkylation in solution or suspension in inert organic solvent may be desired. Suitable solvents include aprotic polar solvents such as dimethylsulfoxide, dimethylacetamide, N-methylpyrollidone, dimethylformamide, acetonitrile, methylene chloride, and especially the more volatile hydrocarbon solvents such as benzene, toluene, ethylbenzene, cyclohexane, petroleum ether, methylethylketone, cyclohexanone, diethylether, tetrahydrofuran, and the like. It has been found that certain difficulty soluble initiators may be initially oxyalkylated in suspension in organic liquid such as toluene, and following oxyalkylation with from 1 to 4 mols of alkylene oxide, will form soluble reaction products which can be further oxyalkylated in solution.

Oxyalkylation temperatures and pressures when employing vinyl polymerization inhibitors are conventional. Temperatures may range from room temperature or below to c.a. 150° C. or higher. Preferably, temperatures in the range of 70° C. to 140° C. are used, more preferably about 90° C. to about 135° C. When highly active DMC catalysts capable of producing ultra-low unsaturation ($\leq 0.010$ meq/g) are used in the present process, it has been rather unexpectedly found that when the reaction is conducted at low temperatures, i.e. below 90° C., and most preferably in the range of 60°–80° C., that polyoxyalkylation can occur at reasonable rates without addition polymerization of the unsaturated moieties present, even in the absence of a vinyl polymerization inhibitor. Alkylene oxide pressure is adjusted to maintain a suitable reaction rate, consistent with the ability of the process system to remove heat from the reactor. Pressures from 5 psig or lower to about 90 psig are useful. A pressure of 8–15 psig, preferably 10–12 psig when employing propylene oxide, ethylene oxide, or mixtures of these alkylene oxides may be advantageous.

Catalyst concentration is generally expressed as ppm based on the weight of the product. The amount of catalyst will depend upon the activity of the particular DMC catalyst. For catalysts of lower activity, such as those useful in preparing low unsaturation polyols, relatively large amounts of catalyst such as 250 ppm to 1000 ppm may be necessary to achieve a substantial reaction rate under the process conditions chosen. With very active catalysts such as those disclosed in U.S. Pat. Nos. 5,470,813, 5,482,908, and 5,545,601, amounts from less than 5 ppm to 250 ppm or higher are useful, more preferably from about 15 ppm to about 150 ppm.

In a typical synthetic procedure, the reaction is begun by introducing the reactive unsaturation-containing, oxyalkylatable initiator into a reaction vessel suitable for polyoxyalkylation, with or without a solvent or organic suspending agent. The catalyst is then introduced, either alone or in admixture with further solvent, suspending agent, or other diluent. The reactor is sealed, flushed with nitrogen, heated to the desired temperature, and alkylene oxide added until a pressure of c.a. 10 psig is reached. The reactor pressure is monitored until an initial pressure drop signifies that the "induction period" characteristic of DMC catalysts is over, and the catalyst has been activated. The induction period may be lessened by use of DMC catalysts suitable for preparing ultra-low unsaturation polyoxyalkylene polyols, and by the use of preactivated catalyst. Once the catalyst has been activated, alkylene oxide or oxides (oxide(s)) are added in admixture and/or in sequence to prepare a product of desired structure and molecular weight. Further details of the oxyalkylation, purification, etc., may be had with reference to the aforementioned U.S. patents, which are incorporated, for this and other purposes, by reference.

The oxyalkylation of the initiator may also take place with continuous addition of the initiator during the course of the reaction as disclosed in copending U.S. application Ser. No. 08/597,781, hereby incorporated by reference. For example, the initiator or initiators may be fed to the reactor continuously, either dissolved in alkylene oxide, dissolved in inert diluent, or, with liquid initiators, neat. The continuous addition of the initiator(s) may also be accompanied by continuous removal of product, resulting in a continuous stabilizer synthesis process, as disclosed in U.S. application Ser. No. 08/683,356, also incorporated herein by reference.

The oxyalkylation of the reactive-unsaturation-containing molecule must be conducted in the presence of a vinyl polymerization inhibitor, preferably of the type which function without the presence of oxygen, since oxyalkylations are generally conducted "in vacuo", meaning in this case that virtually the entire reactor pressure is due to alkylene oxide; or in the presence of a gas inert to the process, e.g. argon, nitrogen, etc. In other words, the partial pressure of oxygen generally, is substantially zero. It is common to flush oxyalkylation reactors with nitrogen one or more times prior to final evacuation and introduction of alkylene oxide. Suitable inhibitors are well known to those skilled in the art of vinyl polymerization. Suitable inhibitors are, for example, 1,4-benzoquinone, 1,4-naphthoquinone, diphenylphenyl-hydrazine, $FeCl_3$, $CuCl_2$, sulfur, aniline, t-butyl-catechol, trinitrobenzene, nitrobenzene, chloranil, and the like. Benzoquinone is preferred.

The inhibitor should be used in an amount effective to inhibit polymerization of the reactive unsaturation-containing initiator. Thus, the amount will vary with the reactivity of the particular type of unsaturation. Acrylates and methacrylates, for example, may require higher levels of inhibitor than less reactive unsaturation-containing initiators. The amount of inhibitor will also vary with oxyalkylation temperature, with higher temperatures requiring higher amounts of inhibitor. Amounts of inhibitor, in weight percent relative to the weight of the reactive-unsaturation-containing initiator, may vary from about 0.01 weight percent to about 5 weight percent, preferably from about 0.05 weight percent to about 1 weight percent, and more preferably from about 0.1 weight percent to about 0.5 weight percent. The latter range is particularly useful with 1,4-benzoquinone. If the vinyl polymerization inhibitor is not used, particularly with less active DMC catalysts, the product may be highly colored, or gelling of the product may occur.

Following oxyalkylation, the product may be vacuum stripped, for example using a stream of nitrogen, to remove unreacted monomers and other volatile components. The product may also be filtered to remove traces of DMC catalysts or their residues or may be subjected to other methods of catalyst removal. When DMC catalysts of the ultra-low unsaturation-producing type are employed, the small amounts of catalysts may be left in the product, or the product may be subjected to simple filtration.

The stabilizers thusly produced may be used to prepare polymer polyols by adding from less than about 0.001 mol to 0.3 mol, preferably 0.01 mol to about 0.1 mol of stabilizer per mol of "base" or "carrier" polyol. One or more vinyl monomers, e.g. acrylonitrile, styrene, acrylic acid, methylmethacrylate, methylacrylate, p-methylstyrene, α-methylstyrene, vinylchloride, vinylidene chloride, bromostyrene, and the like are added singly or in admixture, preferably dissolved in additional carrier polyol. A vinyl polymerization initiator, e.g. an organic peroxide, hydroperoxide, peroxyester, azo compound, or the like is added, and polymerization commenced. Examples of suitable free radical polymerization initiators include acyl peroxides such as didecanoyl peroxide and dilauroyl peroxide, alkyl peroxides such as t-butyl peroxy-2-ethylhexanoate, t-butylperpivalate, t-amyl peroctoate, 2,5-dimethyl-hexane-2,5-di-per-2-ethylhexoate, t-butylperneo-decanoate, t-butylperbenzoate and 1,1-dimethyl-3-hydroxybutylperoxy-2-ethylhexanoate, and azo catalysts such as azobis(isobutyronitrile), 2,2'-azo-bis-(2-methylbutyronitrile), and mixtures thereof. most preferred are the acyl peroxides of the above formula, and the azo catalysts.

The polymerization initiator concentration employed is not critical and can be varied considerably. As a representative range, the concentration can vary from about 0.1 to about 5.0 weight percent or even more, based upon the total feed to the reactor. Up to a certain point, increases in the catalyst concentration result in increased monomer conversion; but further increases do not substantially increase conversion. The particular catalyst concentration selected will usually be an optimum value considering all factors, including costs. It has been determined that low concentrations can be used in conjunction with high potency performed stabilizers while still achieving stable polymer/polyols.

The polymer polyol preparation may be conducted in batch, semi-batch, and continuous processes. Following vinyl polymerization, any unreacted monomers are generally stripped from the product. The monomer-free product may be used as is, or may be filtered to remove any large particles which may have been created. Further reference to polymer polyol preparation may be made to U.S. Pat. Nos. 5,196,476; 4,148,840; 4,454,255; and 5,494,957, which are herein incorporated by reference.

In addition to use as stabilizers in polyether polymer polyol production, the reactive unsaturation-containing stabilizers of the subject invention may also be used for other products, for example, but not by limitation, to form impact modifiers, either ex situ or in situ. For example, preformed vinyl polymer impact modifiers may be prepared by reacting the reactive unsaturation-containing stabilizer with one or more polymerizable vinyl monomers such as those discussed previously, as well as multiply unsaturated monomers such as butadiene and the like. The polymerization may be affected neat, in solution in suitable solvent, or in ordinary or reverse emulsion in an aqueous system. The ex situ impact modifiers may be separated and blended into a polymer, e.g. polystyrene, polymethyl-methacrylate, polyesters, polyamides, and the like which are desired to be impact-toughened. Alternatively, the polymerization to form the polymer to be toughened may take place in the presence of the reactive unsaturation-containing initiator, to prepare an in situ toughened product. Impact toughened polystyrene, polyacrylo-nitrile, SAN, ABS, PVC, and the like may be toughened in this manner. An unexpected benefit of the subject process is that the reactive-unsaturation-containing polyethers of the subject invention are of low color, permitting their use with transparent and white thermo-plastics without inducing undesired coloration.

By the term "well defined" as used herein is meant a composition of relatively predictable composition at the molecular level in view of the initiator used. For example, polyoxypropylation of a reactive-unsaturation-containing molecule with a single oxyalkylatable hydrogen should produce a polyoxypropylene polyether having a hydroxyl group at one terminus and the reactive unsaturation-containing initiator at the opposite terminus. Relatively few or no other types of molecules are expected. The variation in oxypropylation, e.g. the polydispersity, should increase somewhat with increasing molecular weight, but should be relatively low, in the range of 1.0 to 3.0, more preferably in the range of 1.0 to about 2.5, and most preferably in the range of 1.0 to 1.5.

In the case of reactive unsaturation-containing molecules with two non-adjacent oxyalkylatable hydrogen atoms, e.g. 1,4-butenediol, "well-defined" means that in the majority of molecules, the reactive unsaturation should be substantially centered within the polyether backbone, with the extended polyether chains exhibiting expected statistical variation in length. The product should contain less than 10 mol percent and preferably substantially no molecules containing two or more reactive unsaturation sites, unless a starter containing multiple sites is used. In other words, a bis-oxyalkylatable starter should result in a substantially bis-oxyalkylated product without extensive transesterification, Michael-addition reactions, other addition reactions across the site of unsaturation, etc.

Well defined products have hydroxyl functionalities close to that predicted based on the functionality of the initiator. Singly oxyalkylatable initiators, for example, will result in stabilizers having very close to one hydroxyl group per molecule as actually measured, while a bis-oxyalkylatable initiator will result in a product bearing close to two hydroxyl groups per molecule. Specifically, for example, a stabilizer prepared by a process not in accord with the subject invention, for example by esterifying a mono- or bis-hydroxyl-reactive unsaturated moiety with either a conventional polyether polyol or with a DMC-catalyzed low unsaturation polyol, will not produce a well-defined product as that term is used herein. In a like vein, by the term "statistically similar" is meant, with respect to polyoxyalkylene polyether chains formed during preparation of the stabilizer, that the majority of such chains will be of similar length, with variations in length substantially that expected when preparing strictly hydroxyl functional polyoxyalkylene polyols employing DMC catalysts from similarly functional but saturated starter molecules.

Conventional oxyalkylation with alkylene oxides in the presence of basic catalysts cannot be used to prepare the unique reactive unsaturation-containing stabilizers of the subject invention. The base-catalyzed oxyalkylation will introduce a considerable quantity of allyl group-containing oligomers of broad molecular weight range which will dilute the stabilizing ability of the subject stabilizers. Moreover, the various reactants, partial reaction products, etc., will also interact in the presence of the strong base, to produce a variety of transesterifications and side reactions which would lead to a variety of ill-defined chemical linkages.

The stabilizers of the subject invention are quantitatively different from those prepared by reaction of a hydroxyl-reactive, reactive unsaturation-containing monomer with a preformed polyether polyol. In particular, with monofunctional reactive unsaturation-containing initiators such as hydroxyethylmethacrylate, oxypropylation will yield a stabilizer which contains methacrylate functionality at one end of the molecule, and secondary hydroxyl at the other end. By contrast, reaction of methacrylic acid or isocyanatoethylmethacrylate with a polyoxypropylene monol, e.g. polyoxypropylated n-butanol, will result in a methacrylate functional polyether with no hydroxyl functionality. Reaction of isocyanatoethyl-methacrylate or methacrylic acid with a polyoxypropylene diol will result in a mixture containing both singly methacrylate-functional as well as doubly methacrylate-functional products. The products, again, will not be well defined.

Initiators having not more than one carboxylic acid group per molecule are those where the predominant population of molecules contains but one or no carboxylic acid groups. Examples of such initiators are hydroxypropylmethacrylate and methacrylic acid. It would not depart from the spirit of the invention to add minor quantities, i.e. less than 50 mol percent of an unsaturated dicarboxylic acid or related compound such as maleic acid, maleic anhydride, fumaric acid, itaconic acid, 1,4-butynedioic acid, or the like.

Having generally described this invention, a further understanding can be obtained by reference to certain specific examples which are provided herein for purposes of illustration only and are not intended to be limiting unless otherwise specified.

EXAMPLE 1

A one-liter stirred reactor is charged with 105.8 g hydroxypropylmethacrylate, 0.1485 g of a DMC catalyst prepared as disclosed in U.S. Pat. Nos. 5,545,601, and 0.42 g benzoquinone. The mixture is heated to 100° C. with stirring, evacuated, and propylene oxide (29 g) fed to the reactor. The initial pressure of the reactor is 12 psig. After 20 minutes, the reactor pressure drops to -1.0 psig and additional propylene oxide is fed 10 continuously at 6.5 g/min until a total of 645 g has been added. The reactor temperature is maintained at 100° C. throughout this process. After propylene oxide addition is complete, the mixture is held at 100° C. until a constant pressure is observed. Residual unreacted monomer is then stripped under vacuum at 80° C. from the product. The resulting product (725 g) is very slightly yellow with a low viscosity of 134 cps (25° C.). It has a hydroxyl number of 56.6 mg KOH/g and an unsaturation of 0.0092 meq/g. GPC gives a number average weight of 1037 and a polydispersity (Mw/Mn) of 1.04. NMR shows it contains substantially 15 PO units per methacrylate unit. The proposed structure is consistent with NMR and IR results.

COMPARATIVE EXAMPLE C1

A procedure similar to that disclosed by Japanese Kokai H5-209052 (1993) is used to prepare a c.a. 1000 Da molecular weight product, except that a low molecular weight starter is used instead of a much higher weight polyoxypropylated oligomeric starter. To 30 a one liter stirred reactor is added 70 g hydroxypropylmethacrylate and 0.269 g of a t-butanol complexed double metal cyanide catalyst prepared as disclosed in U.S. Pat. No. 5,470,813. In Contradistinction to the subject invention, no vinyl Polymerization inhibitor is added. The reaction mixture is vacuum stripped with nitrogen flushing for eight minutes, and the reactor heated to 130° C. while stirring. Propylene oxide in the amount of 14 g is fed to the reactor, and the reactor pressure reaches 7.8 psig. After 7 minutes, the catalyst is observed to be activated due to an observed pressure drop, and significant exothermic reaction is observed. Propylene oxide is then fed to the reactor at a rate of 3.0 g/min until a total of 430 g is added. The mixture is then held at 130° C. until constant pressure is observed. Residual unreacted propylene oxide is stripped under vacuum at 130° C. The product has a viscosity of 2820 cps at 25° C. despite having a molecular weight of only about 1000 Da. The viscosity may be compared to the very similar product of the preceding example which had a viscosity of only 134 cps, less than one-twentieth the viscosity of the comparative product. However, the material hardens in the collecting bottle and no further analysis is performed.

EXAMPLE 2

A one-liter stirred reactor is charged with 136.4 g product from Example 1, 0.02 g DMC catalyst, and 0.40 g benzoquinone. The mixture is heated to 100° C. with stirring, and stripped under vacuum with nitrogen sparging. After stripping, propylene oxide (25 g) is fed to the reactor. The initial pressure of the reactor is 16 psig. After 22 minutes, the reactor pressure drops to 0.7 psig and additional propylene oxide is fed to the reactor continuously at 6.5 g/min until a total of 131 g has been added. The reaction mixture is then cooked to constant pressure. To the reactor, 28 g acetonitrile is added and PO feeding to the reactor continued at a rate of 6.5 g/min to a total of 660 g. The reactor temperature is maintained at 100° C. throughout this process. After propylene oxide addition is complete, the mixture is held at 100° C. until a constant pressure is observed. Residual unreacted monomer and acetonitrile are then stripped under vacuum at 60° C. from the product. The resulting product, in the amount of 7540 g, has a viscosity of 4,010 cps (25° C.), a hydroxyl number of 10.4 mg KOH/g, and an unsaturation of 0.0044 meq/g. GPC gives a number average molecular weight of 6933 and a polydispersity (Mw/Mn) of 1.26, despite the high molecular weight. NMR shows it contains substantially 92 PO units per methacrylate unit. The proposed structure is consistent with NMR and IR results.

EXAMPLE 3

A one-liter stirred reactor is charged with 100 g product from Example 1, 0.04 g DMC catalyst, 0.3 g benzoquinone and 200 g toluene. The mixture is heated to 100° C. with stirring. Propylene oxide (39 g) is fed to the reactor. The initial pressure of the reactor is 15 psig. After 17 minutes, the reactor pressure drops to 1.4 psig and additional propylene oxide is fed to the reactor continuously at 4 g/min to a total of 100 g. Then, the reaction temperature is increased to 130° C. while PO feeding is maintained at 4 g/min throughout this temperature ramping. After a total of 500 g propylene oxide is added, the mixture is held at 130° C. until a constant pressure is observed. Residual unreacted monomer and toluene are then stripped under vacuum at 60° C. from the product. The resulting product, in the amount of 737 g, has a viscosity of 925 cps (25° C.), and contains 12% of toluene. It has a hydroxyl number of 8.4 mg KOH/g and an unsaturation of 0.0073 meq/g. GPC gives a number average weight of 4853 and a polydispersity (Mw/Mn) of 2.43. The proposed structure is consistent with NMR and IR results.

EXAMPLE 4

To a 12-oz reaction bottle, 100 g styrene, 100 g distilled water, 8 g product from Example 1, 1 g tricalcium phosphate, 0.8 benzoyl peroxide, 0.1 g-t-butyl perbenzoate, 0.6 ml sodium bisulfate (0.3% aq.) and 1 ml Nacconol (1%) are added. The bottle is capped and tumbled end-over-end in a bottle polymerizer at 90° C. for 12 hours. The mixture in the bottle is acidified to pH 1.5 and washed with water. The polystyrene bead product is separated and air-dried. The beads are hot-molded and show a better impact strength than regular polystyrene.

Having now fully described the invention, it will be apparent to one of ordinary skill in the art that many changes and modifications can be made thereto without departing from the spirit or scope of the invention as set forth herein.

What is claimed is:

1. A process for the preparation of a well defined hydroxyl-functional and unsaturation-functional polyoxyalkylene polyether, said process comprising:
    (a) selecting an initiator molecule having a number average molecular weight below about 500 Da, at least one site of carbon-carbon unsaturation, and at least one functional group which is oxyalkylatable by alkylene oxide in the presence of a double metal cyanide complex, wherein said initiator molecule has not more than one free carboxylic acid group;
    (b) oxyalkylating said initiator molecule with one or more alkylene oxides in the presence of an effective amount of a double metal cyanide complex catalyst and in the presence of one or more vinyl polymerization inhibitors;
    (c) recovering a hydroxyl- and unsaturation-functional polyoxyalkylene polyether having not more than substantially one initiator molecule per molecule of polyether and not more than about 0.020 meq/g unsaturation beyond that of initiator molecule-derived unsaturation.

2. The process of claim 1 wherein said initiator molecule has a molecular weight of less than about 300 Da.

3. The process of claim 1 wherein said inhibitor is one which functions in the absence of oxygen.

4. The process of claim 1 wherein said inhibitor is present in an amount of from about 0.01 weight percent to about 5 weight percent based on the weight of said initiator molecule.

5. The process of claim 2 wherein said inhibitor is present in an amount of from about 0.05 weight percent to about 1.0 weight percent based on the weight of said initiator molecule.

6. The process of claim 1 wherein said polyether contains less than about 0.010 meq/g unsaturation other than said initiator molecule-derived unsaturation.

7. The process of claim 1 wherein at least a portion of said oxyalkylation takes place in an aprotic solvent.

8. The process of claim 2 wherein said inhibitor comprises 1,4-benzoquinone.

9. The process of claim 1 wherein said initiator molecule has a molecular weight less than about 300 Da and said polyether has a molecular weight greater than about 2000 Da.

10. The process of claim 1 wherein the number average molecular weight of said polyether is in excess of 4000 Da.

11. The process of claim 1 wherein said initiator molecule comprises a hydroxyalkylacrylate.

12. The process of claim 1 wherein said initiator molecule comprises 2-hydroxyethylacrylate or 2-hydroxypropylacrylate.

13. A polymer polyol stabilizer or preformed precursor, comprising a polyether stabilizer produced by the process of claim 1.

14. A polymer polyol stabilizer or preformed precursor, comprising a polyether stabilizer produced by the process of claim 2.

15. A polymer polyol stabilizer or preformed precursor, comprising a polyether stabilizer produced by the process of claim 6.

16. A polymer polyol stabilizer or preformed precursor, comprising a polyether stabilizer produced by the process of claim 9.

17. A process for the preparation of a polymer polyol, comprising:
    a) selecting one or more hydroxyl-functional base polyol(s) having a nominal functionality of about 2 or more in the aggregate;
    b) adding to said hydroxyl-functional base polyol(s) an effective stabilizing amount of one or more polyethers selected from
        b)i) a polyether prepared in accordance with claim 1;
        b)ii) a preformed stabilizer prepared by the polymerization of one or more vinyl monomers in the presence of a polyether prepared in accordance with claim 1; or
        b)iii) mixtures thereof;
    c) polymerizing one or more vinyl monomers in situ in said base polyol(s) in the presence of said polyether to prepare a stable, low viscosity vinyl polymer dispersion containing from about 10 weight percent to about 70 weight percent vinyl polymer solids.

18. The process of claim 17 wherein said polyether has a number average molecular weight of about 4000 Da or more.

19. The process of claim 17 wherein said polyether has a number average molecular weight of about 8000 Da or more.

20. A process for the preparation of a well-defined hydroxyl-functional and unsaturation-functional polyoxyalkylene polyether, said process comprising:
    (a) selecting an initiator molecule having a number average molecular weight below about 500 Da, at least one site of carbon-carbon unsaturation, and at least one functional group which is oxyalkylatable by alkylene oxide in the presence of a double metal cyanide complex catalyst, wherein said initiator molecule has not more than one free carboxylic acid group;
    (b) oxyalkylating said initiator molecule with one or more alkylene oxides in the presence of an effective amount of a double metal cyanide complex catalyst at a temperature below about 90° C.;
    (c) recovering a hydroxyl- and unsaturation-functional polyoxyalkylene polyether having not more than substantially one initiator molecule per molecule of polyether and not more than about 0.020 meq/g unsaturation beyond that of initiator molecule-derived unsaturation.

21. The process of claim 20 wherein said step of oxyalkylating takes place at a temperature below about 80 ° C.

22. The process of claim 21 wherein said polyethers has molecular weight in excess of 2000 Da.

23. The process of claim 21 wherein said polyether has a molecular weight in excess of 4000 Da.

24. The process of claim 21 wherein said polyether has a molecular weight in excess of 8000 Da.

25. The process of claim 1 wherein the initiator comprises an unsaturated monocarboxylic acid.

26. The process of claim 25 wherein the unsaturated monocarboxylic acid is acrylic acid.

27. The process of claim 1 wherein the alkylene oxides are selected from the group consisting of ethylene oxide, propylene oxide, and mixtures thereof.

28. The process of claim 1 wherein the polyether corresponds to the formula $$R(-X-\{-(R^2-O)_n-H\}_m)_o$$

wherein o is 1, n is an integer whose average value is such that the product n×o is from about 10 to about 500, $R^2$ is alkylene or substituted alkylene, X is

and R is a $C_2$–$C_{30}$ hydrocarbon containing one site of ethylenic unsaturation.

29. The process of claim 1 wherein the polyether has a polydispersity in the range of 1.0 to 1.5.

* * * * *